US007460966B1

(12) United States Patent  (10) Patent No.: US 7,460,966 B1
Hattori  (45) Date of Patent: Dec. 2, 2008

(54) MICROCONTROLLER THAT MAINTAINS CAPACITORS OF AN ANALOG CIRCUIT IN A CHARGED STATE DURING LOW POWER OPERATION

(75) Inventor: Hidefumi Hattori, Palo Alto, CA (US)

(73) Assignee: ZiLOG, Inc., San Jose, CA (US)

( * ) Notice: Subject to any disclaimer, the term of this patent is extended or adjusted under 35 U.S.C. 154(b) by 462 days.

(21) Appl. No.: 11/406,099

(22) Filed: Apr. 18, 2006

(51) Int. Cl.
*G01R 21/00* (2006.01)

(52) U.S. Cl. ........................................... 702/61

(58) Field of Classification Search ................ 702/61; 323/299; 713/320; 340/3.4; 327/530; 363/125
See application file for complete search history.

(56) References Cited

U.S. PATENT DOCUMENTS

| 5,939,998 | A  | * | 8/1999 | Caporuscio et al. ......... 340/3.4 |
| 7,080,270 | B2 | * | 7/2006 | Yokozeki et al. ........... 713/320 |
| 2004/0263237 | A1 | * | 12/2004 | Kim et al. ................ 327/530 |
| 2005/0207195 | A1 | * | 9/2005 | Olsson et al. .............. 363/125 |
| 2006/0176040 | A1 | * | 8/2006 | Kernahan et al. .......... 323/299 |

* cited by examiner

*Primary Examiner*—Tung S Lau
*Assistant Examiner*—Xiuquin Sun
(74) *Attorney, Agent, or Firm*—Imperium Patent Works; Darien K. Wallace

(57) ABSTRACT

An analog circuit of a microcontroller includes a switch that is coupled in series with a capacitor of the analog circuit. During nominal power mode operation, an operational voltage is present on the capacitor. The switch is conductive so that the capacitor is switched into the analog circuit and so that the capacitor operates as part of the analog circuit. At the beginning of sleep mode operation, the switch is made nonconductive thereby effectively switching the capacitor out of the analog circuit and storing the operational voltage on the capacitor. When the analog circuit is powered up again after sleep mode operation, the switch is made conductive to switch the capacitor back into the analog circuit. Because the capacitor still holds a substantial voltage, analog circuit wake up time is reduced because the time required to charge the capacitor up to its operational voltage is reduced.

20 Claims, 3 Drawing Sheets

MICROCONTROLLER THAT MAINTAINS CAPACITORS OF AN ANALOG CIRCUIT IN A CHARGED STATE DURING LOW POWER OPERATION

TECHNICAL FIELD

The present invention relates to microcontrollers involving analog circuitry.

BACKGROUND

Microcontrollers are usually general purpose integrated circuits. To facilitate use in multiple different applications, a microcontroller may include an amount of general purpose analog circuitry. Such general purpose analog circuitry may, for example, involve an operational amplifier that can be used to perform filtering and amplification on an input signal prior to subsequent analog-to-digital conversion by another part of the general purpose analog circuitry. Providing the analog circuitry (the operational amplifier and the analog-to-digital converter) on the microcontroller integrated circuit allows the microcontroller to perform periodic measurements of the input signal.

Not only is the microcontroller to perform the periodic measurement function, but the microcontroller is also to consume a very small amount of power so that the microcontroller can be powered from a battery. Low power consumption is desired in order to extend battery life. To reduce power consumption, the microcontroller may have a low power sleep mode of operation. In the low power sleep mode, only a small amount of circuitry (for example, a low power clock generator and a sleep mode timing circuit) is powered. The remainder of the microcontroller circuitry (the digital processor, the analog circuitry, memory, and any other circuitry) is powered down, thereby reducing power consumption. Then, when the microcontroller is to perform its functions, the sleep mode timing circuitry supplies a power up signal to the remainder of the microcontroller circuitry. The remainder of the microcontroller circuitry powers up and performs its functions. Once the functions have been performed, the sleep mode timing circuitry supplies a power-down signal to the remainder of the microcontroller circuitry. By maintaining the microcontroller in the low power sleep mode for the majority of time, overall power consumption is reduced. On the market today, there are many different variations of sleep mode functionality for putting a microcontroller in sleep mode. The description above is a simplified explanation of just one example of such sleep mode functionality.

Powering up the digital processor portion of the microcontroller is generally relatively fast because transistors in the digital circuitry are generally small and in operation are either on or off. Voltages on internal nodes within the digital circuitry are generally at a digital high voltage or a digital low voltage. The noise margin in such digital circuitry is high, and the capacitances of internal nodes within the digital circuitry are typically relatively small. As a consequence, there is usually only a small delay after power and ground voltages are supplied to the digital circuitry before the digital circuitry is operational.

In comparison to the digital circuitry, the analog circuitry of the microcontroller may take a relatively longer amount of time to power up and become operational. Transistors in the analog circuitry are often larger and not just either on or off, but rather may operate in their linear regions. Voltages on internal nodes with the analog circuitry during circuit operation are often to be at voltages other than a digital high voltage or a digital low voltage. These are often determined by the combination of resistor values and available current. Internal nodes within the analog circuitry may often have relatively large capacitances. Due to these reasons, it may take a relatively larger amount of time after power and ground voltages are supplied for voltages to stabilize and for the analog circuitry to be operational.

Consider a microcontroller application where the microcontroller includes analog circuitry that is to be used to perform a periodic measurement function. The sleep mode timer and clock generator supplies a power-on signal to the remainder of the microcontroller circuitry. Power and ground voltages are supplied to the digital processor and the analog circuitry. The digital circuitry is operational and ready to perform processing, but it may be as long as a few hundred milliseconds before the analog circuitry is operational. Where the analog function involves performing a measurement using the analog circuitry, the measurement cannot take place until a few hundred milliseconds have expired. The measurement is then taken, and the sleep mode timer again asserts the power-down signal. The microcontroller again enters low power sleep mode operation. This periodic powering up of the microcontroller allows the microcontroller to perform periodic measurements while operating for the majority of the time in the low power sleep mode. This is desirable, but unfortunately there is a relatively large period of time (for example, a few milliseconds) that the microcontroller is not fully operational following each assertion of the power-on signal. Having to wait this period of time to perform an analog measurement is undesirable. Moreover, the digital processor of the microcontroller may be clocked during this time and consequently the digital processor may be consuming a significant amount of power during this time. A solution is desired.

SUMMARY

An integrated circuit (for example, a microcontroller integrated circuit) includes an analog circuit. The analog circuit includes a capacitor of a relatively large capacitance such as, for example, one half picofarad (½ pF) or more. During operation in a nominal power mode, an operational voltage is present on the capacitor. In accordance with one novel aspect, a switch (for example, a passgate or a single transistor) is provided in series with the capacitor. The electrical characteristics (for example, the switch on-resistance) of the switch are such that the presence of the switch in series with the capacitor does not prevent the analog circuit from operating satisfactorily, or they are considered in the design.

In the nominal power mode, the switch is conductive so that the capacitor is switched into the remainder of the analog circuit and so that the capacitor operates as part of the analog circuit. As the analog circuit performs an analog signal processing function, the operational voltage on the capacitor may vary somewhat, but the voltage is generally a nonzero value.

The analog circuit is then powered down for a relatively short period of time. An example of such a power down condition is the analog circuit being put into low power sleep mode operation. At the time that operation of the analog circuit transitions from the nominal power mode to the low power sleep mode, the switch that is series with the capacitor is made to be substantially nonconductive (the switch becomes an open). This effectively switches the capacitor out of the analog circuit by breaking a current path from the capacitor and into the analog circuit. One of the leads of the capacitor is no longer coupled to the analog circuit. As a result of the switch being made nonconductive, the operational voltage that was on the capacitor immediately preceding entering the low power sleep mode is stored on the capacitor. During subsequent low power mode operation when the analog circuit is unpowered, the nonconductive switch keeps the charge on the capacitor from leaking into the analog circuit. Essentially the only leakage of the charge from the capacitor is due to leakage within the capacitor and switch. The voltage stored on the capacitor therefore only slowly decreases from the operational voltage.

At the conclusion of low power sleep mode operation period, power is again supplied to the analog circuit so that the analog circuit will be operational and can be used to perform analog signal processing in the nominal power mode. At the time of transitioning from the low power sleep mode to the nominal power mode, the switch is made conductive again, thereby effectively switching the capacitor back into the analog circuit.

In one novel aspect, there is a nonzero voltage present on the capacitor at the time that the capacitor is switched back into the analog circuit. In this example, the nonzero voltage is at least half of the operational voltage. Rather than having to wait a longer amount of time for the capacitor to be recharged from zero volts up to a proper operational voltage before the analog circuit can be used, only a shorter amount of time is required to charge the capacitor from its nonzero voltage up to the operational voltage before the analog circuit can be used. The "wake up" time of the analog circuit when coming out of the low power sleep mode is therefore reduced.

The disclosed novel circuits and methods see special use in a low power microcontroller integrated circuit. In one example, the circuitry that controls the switches that switch the capacitor in and out of the analog circuit is the same low power sleep mode circuitry that controls when the microcontroller integrated circuit operates in a low power sleep mode and when the microcontroller integrated circuit operates in a nominal power mode. Further details are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
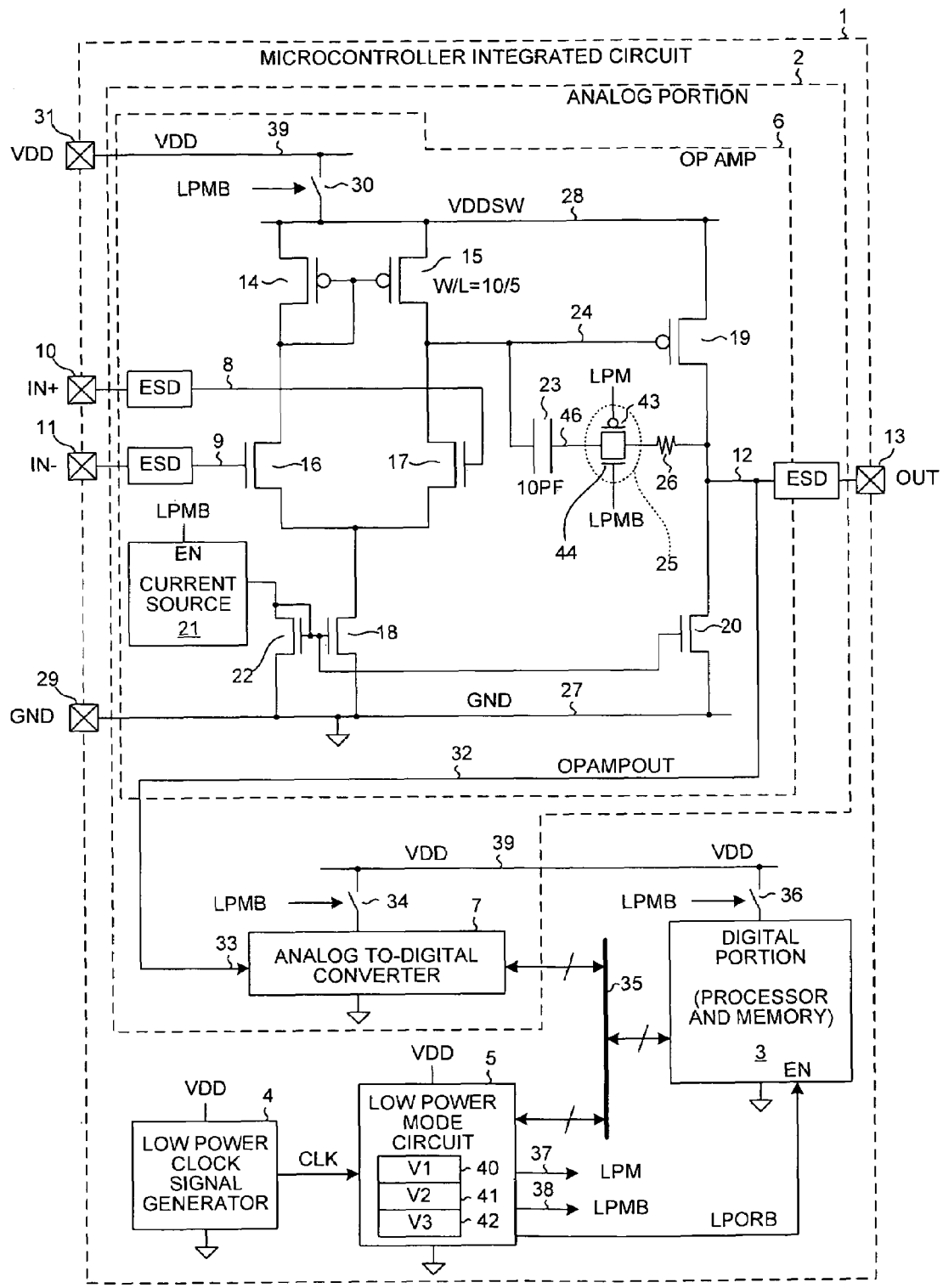
FIG. 1 is a simplified diagram of a microcontroller integrated circuit in accordance with one novel aspect.

FIG. 1 is a simplified diagram of a microcontroller integrated circuit 1 in accordance with one novel aspect. The microcontroller integrated circuit 1 includes an analog portion 2, a digital portion 3, a low power clock signal generator 4 and a low power mode circuit 5.

Analog portion 2 includes non-digital circuitry involving transistors that operate in their linear regions. Although there may be some digital logic within analog portion 2, the signal or signals that are processed in the analog portion are not digital signals, but rather are analog signals. Examples of such non-digital circuitry include amplifiers, analog filters, analog portions of analog-to-digital converter and digital-to-analog converters, bypass circuitry, charge pumps, current sources, voltage regulators, and oscillators. In the example of FIG. 1, analog portion 2 includes an operational amplifier 6 and an analog-to-digital converter (ADC) 7.

Operational amplifier 6 is a general purpose operational amplifier whose differential input leads 8 and 9 extend to input terminals IN+ 10 and IN– 11 of the microcontroller integrated circuit. A user of the microcontroller integrated circuit can make connections to the differential input terminals IN+ and IN– on the printed circuit board upon which the microcontroller integrated circuit is disposed. The output lead 12 of operational amplifier 6 is similarly extended to a terminal OUT 13 of the microcontroller integrated circuit so that a user can have board-level access to the signal output from operational amplifier 6. Transistors 14-18 form a differential input stage of the operational amplifier, and transistors 19-20 form an output stage of the operational amplifier. Current source 21 and transistor 22 control current flow through the input and output stages in standard fashion. Operational amplifier 6 includes a compensation capacitor 23 (10 picofarads in this example) that is resistively coupled between the output node 24 of the first stage and the output node 12 of the second stage. If passgate 25 is conductive, then compensation capacitor 23 and resistor 26 serve to stabilize operational amplifier operation by reducing the cutoff frequency of the amplifier. The output of operational amplifier 6 can swing between two rail voltages. In the present example, the lower rail voltage is ground potential (GND) on conductor 27. The higher rail voltage is a VDD switched voltage (VDDSW) that is present on conductor 28. Conductor 27 is directly connected to a ground terminal GND 29 of microcontroller integrated circuit 1. If switch 30 is conductive, then VDDSW conductor 28 is coupled to a supply voltage VDD terminal 31 of the microcontroller integrated circuit. VDD in this case is 3.3 volts. Operational amplifier 6 is used with feedback circuitry that is disposed on the printed circuit board external to the microcontroller integrated circuit.

The output signal on conductor OPAMPOUT 32 is coupled to a data input lead 33 of ADC 7. If switch 34 is conductive and ADC 7 is powered and operational, ADC 7 converts an analog voltage level on lead 33 into a corresponding multi-bit digital value. Where, for example, the operational amplifier 6 is used to amplify a low level signal voltage output by a sensor (not shown), ADC 7 converts the amplified signal on lead 33 into a multi-bit digital value that is indicative of the magnitude of the sensor output signal. The multi-bit digital value is placed in a register within ADC 7 such that the multi-bit digital value can be read across a digital bus 35.

Digital portion 3 includes digital circuitry that processes digital signals. Although there may be some analog circuitry within digital portion 3, the majority of the circuitry is digital logic. Examples of digital circuitry include digital logic gates, digital sequential logic elements, and memories. In the example of FIG. 1, digital portion 3 includes a digital processor and an amount of memory. The memory includes a register file, random access memory (RAM), and program memory storage. The processor and memory may, for example, be a digital processor of the Z8 architecture and that executes the Z8 instruction set. If switch 36 is conductive and if digital portion 3 is powered and operational, and if the processor is supplied with an adequate clock signal, then the processor of digital portion 3 can read the multi-bit digital value out of the register in ADC 7 across bus 35.

Microcontroller 1 has a low power mode (LPM) of operation and a nominal power mode of operation. The low power mode is sometimes called a "sleep mode". In the low power sleep mode, analog portion 2 and digital portion 3 are not powered. Analog portion 2 does not perform its analog signal processing functions, and digital portion 3 does not perform its digital functions. Low power mode circuit 5 determines when the microcontroller is to operate in the low power mode. Low power clock signal generator 4 and low power mode circuit 5 are directly coupled to supply voltage VDD and ground potential such that they are always powered from terminals 31 and 29, even during low power mode operation. Low power clock signal generator 4 is a low power and low frequency on-chip clock generator that generates a clock signal CLK. Clock signal CLK clocks the low power mode circuit 5. When appropriate, low power mode circuit 5 causes microcontroller integrated circuit 1 to enter the low power sleep mode by asserting (forcing a digital high) a low power mode LMP signal on output lead 37, and by deasserting (forcing a digital low) a low power mode "bar" LMPB signal on output lead 38. When LMPB is forced low, the switches 30, 34 and 36 are made to be nonconductive (i.e., open). As a result, operational amplifier 6, ADC 7 and digital portion 3 no longer can receive power from terminal 31 and VDD supply voltage conductor 39.

The low power mode circuit 5 can also cause microcontroller integrated circuit 1 to enter the nominal power mode of operation by deasserting (forcing to a digital low) the LMP signal and asserting (forcing to a digital high) the LMPB signal. The switches 30, 34 and 36 are made conductive, and operational amplifier 6, ADC 7 and digital portion 3 are powered up by a flow of supply current from VDD supply conductor 39. Once powered and operational, the operational amplifier 6 and ADC 7 can perform their analog signal processing functions, and digital portion 3 can execute instructions and perform its functions.

Figure 2:
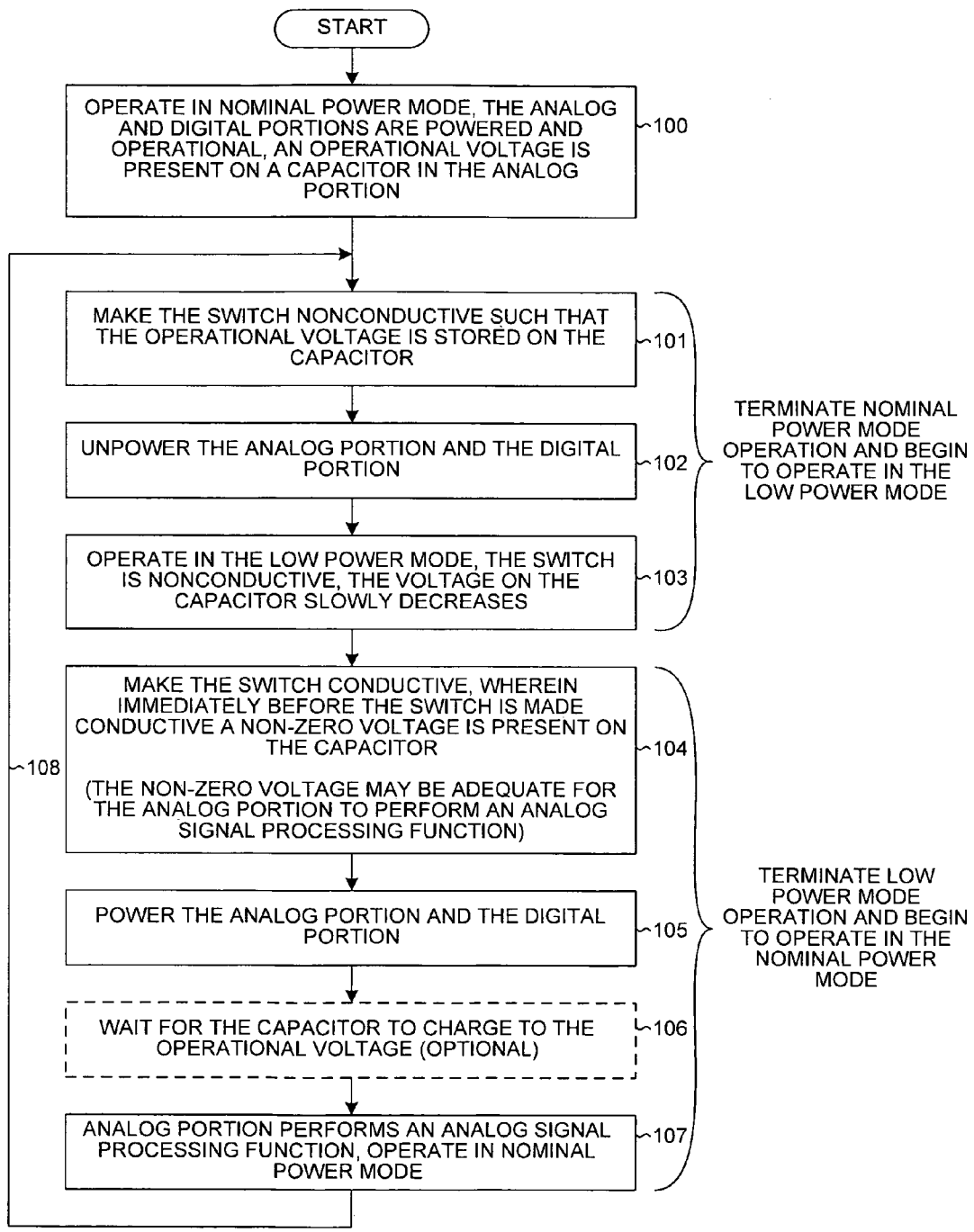
FIG. 2 is a flowchart that illustrates a method of operation of the microcontroller integrated circuit of FIG. 1.

FIG. 2 is a simplified flowchart of an operation of microcontroller integrated circuit 1 of FIG. 1. Initially (step 100), the microcontroller integrated circuit 1 operates in the nominal power mode. The LMP signal is at a low digital logic value. LMPB is at a high digital logic value. Switches 30, 34 and 36 are conductive. Operational amplifier 6 and ADC 7 are powered and operational. The sensor output signal across terminals IN+ and IN− is being amplified by operational amplifier 6 and the amplified signal is converted into a multi-bit digital value by ADC 7. Operational amplifier 6 has a fixed gain due to external feedback components (not shown). The voltages on the various nodes within the operational amplifier are stabilized at their steady state values. In the present example, the voltage on node 24 could be 2.3 volts and the voltage on node 46 could be 1.6 volts. An operational voltage of approximately 0.7 volts could therefore present across compensation capacitor 23.

The digital processor of digital portion 3 reads the multi-bit digital value out of the register in ADC 7, thereby monitoring the magnitude of the signal output of the sensor. Power and ground nodes within the digital portion 3 are stabilized.

Next (step 101), nominal power mode operation is terminated and operation in the low power mode begins. In the example of FIG. 1, low power mode circuit 5 is programmable by the digital processor across bus 35 to store three multi-bit digital values, V1, V2 and V3. These three values may be written into registers 40, 41 and 42, respectively, within low power mode circuit 5. First value V1 determines an amount of time that the microcontroller will operate in the nominal power mode until the mode is changed and the microcontroller is made to operate in the low power mode. Second value V2 determines an amount of time that the microcontroller will operate in the low power mode before the analog and digital portions 2 and 3 are made to wake up and operate in the nominal power mode. Third value V3 determines an amount of time after the microcontroller is put into the nominal power mode that a local power on reset "bar" (LPROB) signal will be deasserted (maintained at a digital low value).

In the example of FIG. 1, low power mode circuit 5 maintains LPM deasserted (nominal power mode operation) for a number of CLK counts indicated by value V1. When the number of CLK counts indicated by V1 is reached, low power mode circuit 5 asserts LMP and deasserts LMPB. The P-channel field effect transistor 43 (W/L=1/0.35) and the N-channel field effect transistor 44 (W/L=1/).35) of pass-gate 25 are both made nonconductive (step 101), effectively isolating the right lead of compensation capacitor 23 from node 12. The operational voltage that was present on compensation capacitor 25 immediately prior to assertion of LPM is stored on compensation capacitor 23.

Signal LMP going high also causes switches 30, 34 and 36 to be nonconductive thereby unpowering (step 102) the analog portion 2 and the digital portion 3. Current source 21 is also disabled due to the signal LPMB being a digital low. When current source 21 is disabled, the output of the current source is coupled to ground conductor 27, and this shorts the gates of transistors 18, 20 and 22 to ground. As a result, there is no current flow through transistors 22, 18 and 20. Although steps 101 and 102 are illustrated as separate steps in FIG. 2, the actions illustrated in blocks 101 and 102 of FIG. 2 actually occur simultaneously.

After the high-to-low transition of signal LMP, the microcontroller operates (step 103) in the low power mode. Passgate 25 is nonconductive. The only decrease in the operational voltage on the compensation capacitor is due to leakage through the compensation capacitor and switches themselves. Low power mode circuit 5 maintains signal LPM asserted until the amount of time indicated by V2 has expired. V2 may, for example, be a count. The low power mode circuit 5 starts counting upon entering the low power mode.

When the count reaches the second value V2, then the low power mode circuit 5 forces the LPM signal low. This terminates low power mode operation and starts operation in the nominal power mode. When LPM is forced low and LPMB is forced high, both transistors 43 and 44 of passgate 25 are made conductive (step 104). The rightmost lead of compensation capacitor 23 is again coupled through pass-gate 25 and resistor 26 to node 12. In accordance with one novel aspect, a significant portion of the voltage of the operational voltage still remains on compensation capacitor 23 at the time that passgate 25 is made conductive. In comparison to a conventional compensation capacitor circuit where prolonged sleep mode operation would result in virtually all charge leaking off the compensation capacitor and would require the compensation capacitor to be charged from zero volts back up to the proper operational voltage before the analog circuit can be used to perform its analog processing function, the novel compensation capacitor circuit of FIG. 1 has a compensation capacitor that still retains a significant portion of its operation voltage charge. Accordingly, the amount of time required to charge the compensation capacitor up to a suitable operational voltage is generally reduced. In the present example where the operational voltage across compensation capacitor 23 was a stable 0.7 volts, and where the same operational voltage of 0.7 volts is to be present across the compensation capacitor 23 upon reentering nominal power mode operation, the presence of some charge on compensation capacitor 23 reduces the amount of time until analog portion 2 can be used in comparison with a conventional compensation capacitor that is entirely discharged.

In addition to making passgate 25 conductive, forcing signal LMP to a digital high value powers up (step 105) operational amplifier 6 and ADC 7 by causing switches 30, 34 and 36 to be made conductive (steps 104 and 105 occur simultaneously). Operational amplifier 6 receives a supply current through conductive switch 30. ADC 7 receives a supply current through conductive switch 34. The voltages on the various internal nodes within analog portion 2 begin to stabilize to their steady state voltages. Similarly, signal LMP being a digital high causes digital portion 3 to receive supply current through conductive switch 36. The voltages on the various internal nodes of digital portion 3 begin to stabilize to their steady state voltages. As explained above, the small capacitances of the internal nodes and the operation of digital circuitry allow digital portion 3 to reach a properly powered and operational state before the analog portion 2 reaches such a proper operating state.

While analog portion 2 and digital portion 3 are being powered up (step 105), the low power mode circuit 5 keeps the local power on reset signal (LPORB) at a digital low value. Third value V3 determines the amount of time after entering the nominal power mode that the low power mode circuit 5 keeps the LPORB signal low. The LPORB signal is supplied to an active low reset input lead or an active high enable input lead of digital portion 3 such that the digital portion will not read in an erroneous multi-bit digital value out of ADC 7. The reset condition due to LPORB condition prevents erroneous operation during the initial power up period of the analog and/or digital portions. The amount of time that the LPORB signal remains low after the low-to-high transition of LPM is indicated as the waiting step (step 106) in the flowchart of FIG. 2. As indicated by the dashed box, waiting step 106 is optional. In some applications, erroneous operation for a brief initial period after powering up the analog portion 2 is acceptable. In the example of FIG. 1, however, there is an LPORB signal that keeps the processor disabled until analog circuit 2 has powered up and is operational. The amount of time that LPORB must remain low after the low-to-high transitioning of LPM is advantageously reduced in the embodiment of FIG. 1 due to capacitances such as the compensation capacitor 23 within analog portion 2 not being entirely discharged at the time the power up operation is begun.

When the LPORB time expires as determined by V3 and low power mode circuit 5, low power mode circuit 5 forces LPORB high. The processor within digital portion 3 comes out of a suspended or reset state, reads the multi-bit value from ADC 7, and performs a function using the retrieved value. The microcontroller 1 then operates in the nominal power mode (step 107). As indicated by the arrow 108 in the flowchart of FIG. 2, the operations of blocks 101-107 are repeated over and over. The proportion of time that the microcontroller is operating the low power mode is high. The amount of time that analog portion 2 takes to power up and stabilize and become operational after entering the nominal power mode is reduced.

Figure 3:
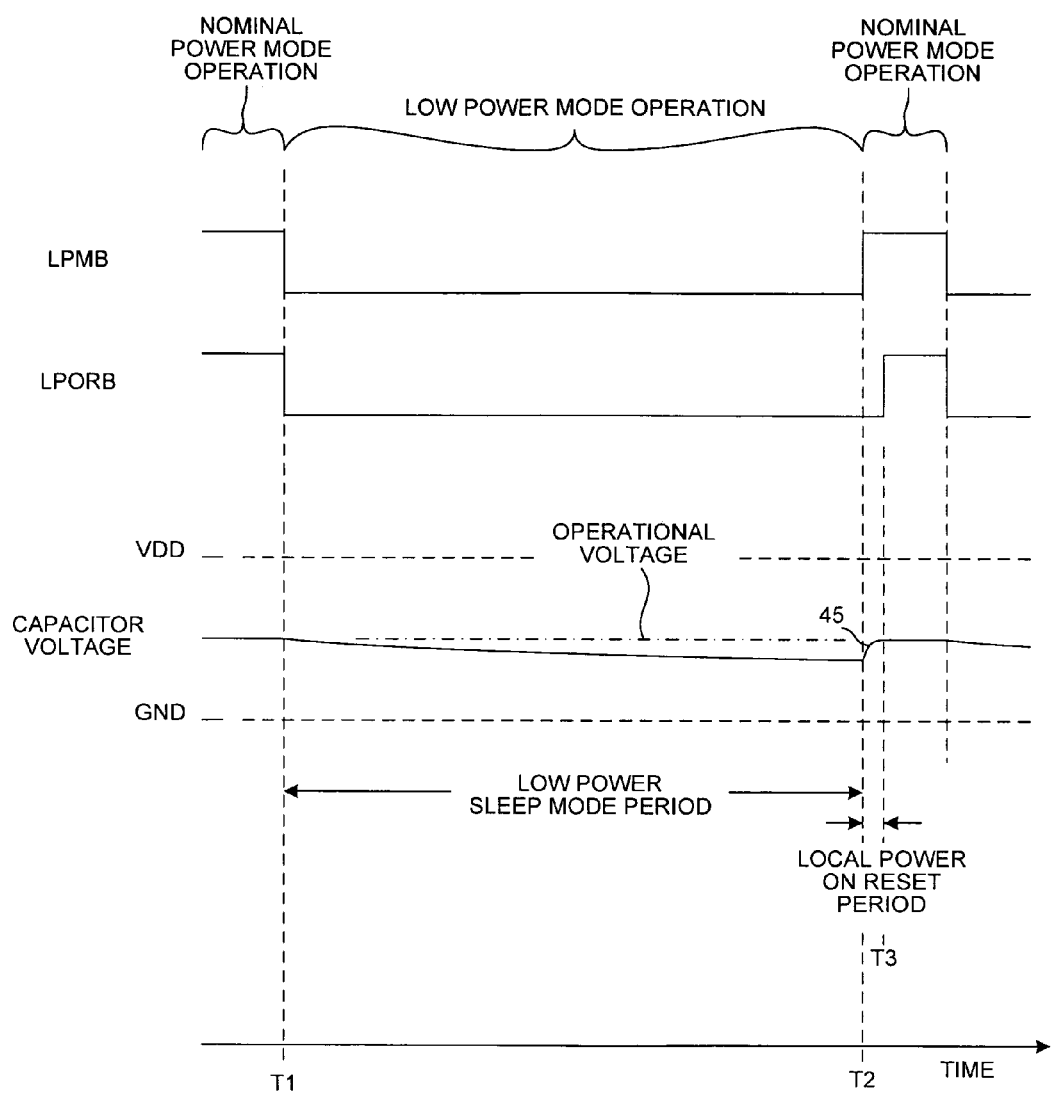
FIG. 3 is a waveform diagram that illustrates the method of FIG. 2.

FIG. 3 is a simplified waveform diagram that illustrates an operation of the microcontroller integrated circuit of FIG. 1. Microcontroller 1 is initially operating in the nominal power mode. Signal LPM is at a digital low value, and LPMB is at a digital high value. The local power on reset bar LPORB signal is at a digital high. Compensation capacitor 23 is operating as part of the operational amplifier and passgate 25 is substantially conductive. As indicated in the bottom waveform, the voltage on compensation capacitor 23 is stable at the operational voltage.

Then, at time T1, the low power mode circuit 5 forces the signal. LPM to a digital high value and forces the signal LPMB to a digital low value. This causes the switches 30, 34 and 36 to open and causes the microcontroller to power down and begin operation in the low power mode. Low power mode circuit 5 also forces the LPORB signal low, thereby maintaining the processor in a reset or disabled state. Forcing signal LPM to a digital high and forcing signal LPMB to a digital low causes passgate 25 to be substantially nonconductive, thereby effectively breaking any current leakage path out of compensation capacitor 23. As time proceeds from time T1 to the right in FIG. 3, the voltage stored on compensation capacitor 23 leaks away only very slowly.

Then, at time T2, the low power mode circuit 5 forces the signal LPM to a digital low value and forces the signal LPMB to a digital high value. This causes pass-gate 25 to become conductive, effectively coupling compensation capacitor 23 back into the operational amplifier circuitry. Although the voltage on compensation capacitor 23 has decayed somewhat during low power mode operation, there is still is significant voltage on compensation capacitor 23 at time T2. In one example, the timing and sizing of components is such that the voltage on compensation capacitor 23 at time T2 is more than half of the operational voltage present on compensation capacitor at time T1.

Forcing signal LPM to a digital low value and forcing signal LPMB to a digital high value also causes switches 30, 34 and 36 to be made conductive. Power is therefore applied to analog portion 2 and digital portion 36. The powering up of analog portion 2 causes the compensation capacitor 23 to begin to be charged back up to its steady state operational voltage. This recharging is represented in FIG. 3 by the upward bend 45 in the capacitor voltage waveform.

When the analog portion 2 and the digital portion 3 have been powered up and are operational, the local power on reset period expires at time T3. The analog and digital circuitry of portions 2 and 3 are then fully operational. In the example of FIG. 1, the digital processor within digital portion 3 begins executing instructions, reads the multi-bit digital value out of ADC 7, and begins performing its functions. Note from FIG. 3 that the low power period is substantially greater than the period of time that the microcontroller is operating in the nominal power mode.

Although a specific example is set forth above involving a single compensation capacitor that is effectively switched out of an analog circuit at the time of power down, there may be many capacitors that are simultaneously switched out of a single analog circuit. Capacitors having uses and functions other than compensation capacitors may be switched out using the disclosed method. A bypass capacitor, for example, is an example of a capacitor that may be switched out of the analog circuit so as to maintain its steady state voltage during a subsequent low power mode operation so that at least some of the voltage will remain on the bypass capacitor when the analog circuit is powered up again following low power sleep mode operation. Capacitors that are switched out of an analog circuit in accordance with the above-described novel method can be filtering capacitors or coupling capacitors. A capacitor can be switched out of an analog circuit by disconnecting either one or both of the leads of the capacitor from the analog circuit.

In one embodiment, the capacitor structure involves a sandwich of two conductive plate structures (for example, two layers of doped polysilicon or two layers of metal) that are disposed in parallel with one another, and that are separated by a suitable thin dielectric layer (for example, a layer of oxide or silicon nitride). The capacitor structure is specifically designed to function as a capacitor in the analog circuit, has a capacitance of more than one half picofarad (½ pF), and is not just an incidental small capacitance that is a secondary characteristic of another circuit structure.

In one example, digital portion 3 involves a digital processor that receives a precision clock signal from a crystal oscillator circuit (not shown). The crystal oscillator circuit is unpowered during low power sleep mode operation. When the LMP signal is forced force low, power is supplied to the crystal oscillator but it takes an amount of time (for example, two milliseconds) for the crystal oscillator to start oscillating and to begin functioning reliably. In addition to the use described above involving compensation capacitor 23, the LPORB signal is also used to prevent the digital processor from executing instructions until the crystal oscillator is properly powered and functioning.

Various mechanisms for determining when to enter the low power mode and for determining when the exit the low power mode can be used. For example, a low power sleep mode circuit can be used to put the analog and digital portions of a microcontroller into a low power sleep mode and to determine when the analog and digital portions will be taken out of the low power sleep mode. After the digital portion is operational and executing instructions in the nominal power mode, the digital processor of the digital portion initiates putting the microcontroller back into the low power sleep mode by writing appropriate control information into the low power sleep mode circuit. The low power sleep mode circuit responds to the control information by asserting the LMP signal such that the analog and digital portions are put into the low power sleep mode as previously set up by the digital processor.

In the topology of FIG. 1, switches 30, 34 and 36 may have to be made very large in order to achieve a desired low on-resistance between VDD terminal 31 and the analog portion 2 and the digital portion 3. The switch mechanism described above for coupling analog portion 2 and digital portion 3 to receive supply voltage VDD is a simplification that is presented for instructional purposes. Other well-known mechanisms for selectively powering and unpowering various parts of an integrated circuit may be employed.

Although the method of switching a charged capacitor out of an analog circuit when entering a low power mode is described above in connection with a microcontroller, the method has general applicability and is not limited to use in microcontrollers. Circuitry other than low power sleep mode circuitry of a microcontroller can be used to supply control signals to switch a charged capacitor out of an analog circuit when going into a low power sleep mode so that the charged capacitor can later be switched back into the analog circuit during a subsequent wake up operation.

Accordingly, various modifications, adaptations, and combinations of various features of the described embodiments can be practiced without departing from the scope of the invention as set forth in the claims.

What is claimed is:

1. A method comprising:
   (a) operating a microcontroller in a nominal power mode, wherein the microcontroller comprises a digital circuit and an analog circuit, wherein in the nominal power mode both the digital circuit and the analog circuit are powered, wherein the analog circuit comprises a capacitor and a switch, the switch being coupled in series with the capacitor, the capacitor having a capacitance of at least one half picofarad, wherein a first voltage is present across the capacitor when the microcontroller is operating in the nominal power mode;
   (b) terminating microcontroller operation in the nominal power mode and beginning microcontroller operation in a low power mode, wherein said terminating and beginning comprises:
      (b1) making the switch substantially nonconductive such that the first voltage is stored on the capacitor;
      (b2) unpowering the analog circuit; and
      (b3) unpowering the digital circuit;
   (c) operating the microcontroller in the low power mode, wherein during the low power mode the switch is substantially nonconductive; and
   (d) terminating microcontroller operation in the low power mode and beginning microcontroller operation in the nominal power mode, wherein said terminating and beginning comprises:
      (d1) making the switch substantially conductive, wherein immediately before the switch is made substantially conductive a non-zero second voltage was present across the capacitor;
      (d2) powering the analog circuit; and
      (d3) powering the digital circuit.

2. The method of claim 1, wherein the second voltage is at least one half of the first voltage.

3. The method of claim 1, wherein there is no intervening active circuit element disposed in an electrical path between the switch and the capacitor.

4. The method of claim 1, wherein the switch is a pass-gate.

5. The method of claim 1, wherein the analog circuit is powered by supplying a supply voltage VDD to the analog circuit across a pair of power conductors, wherein the first voltage is smaller than the supply voltage VDD.

6. The method of claim 1, further comprising:
   generating a low power mode signal on the microcontroller integrated circuit, wherein asserting the low power mode signal causes the microcontroller to operate in the low power mode, and wherein deasserting the low power mode signal causes the microcontroller to operate in the nominal power mode; and
   supplying the low power mode signal to the switch such that the switch is substantially nonconductive when the low power mode signal is asserted and such that the switch is conductive when the low power mode signal is deasserted.

7. The method of claim 1, wherein the microcontroller repeatedly cycles during a time period back and forth between the nominal power mode and the low power mode, and wherein the microcontroller operates in the low power mode during the time period more than ten times longer than it operates in the nominal power mode.

8. The method of claim 1, further comprising:
   waiting an amount of time after the powering of (d2), and after the amount of time then using the analog circuit to perform an analog signal processing function.

9. The method of claim 1, further comprising:
   using the analog circuit to perform an analog signal processing function without waiting an amount of time after the powering of (d2).

10. The method of claim 1, further comprising:
    controlling when the analog circuit is first used after (d2) to perform an analog signal processing function based at least in part on a duration of the operating in the low power mode of (c).

11. The method of claim 1, wherein the analog circuit is an amplifier, wherein the capacitor is a compensation capacitor and is part of the amplifier, wherein the digital circuit is a digital processor, and wherein the first voltage varies when the microcontroller is operating in the nominal power mode in (a).

12. The method of claim 1, wherein the analog circuit is an analog filter, wherein the capacitor is part of the analog filter, wherein the digital circuit is a digital processor, and wherein the first voltage varies when the microcontroller is operating in the nominal power mode in (a).

13. An integrated circuit comprising:
a low power mode circuit that outputs a low power mode signal;
a digital portion, wherein the digital portion is powered when the low power mode signal is deasserted, and wherein the digital portion is unpowered when the low power mode signal is asserted; and
an analog portion, wherein the analog portion is powered when the low power mode signal is deasserted, and wherein the analog portion is unpowered when the low power mode signal is asserted, wherein the analog portion comprises:
 a capacitor having a capacitance of at least one half picofarad; and
 a switch that is coupled in series with the capacitor, wherein the switch is substantially conductive when the low power mode signal is deasserted, and wherein the switch is substantially nonconductive when the low power mode signal is asserted.

14. The integrated circuit of claim 13, wherein there is no intervening active circuit element disposed in an electrical path between the switch and the capacitor.

15. The integrated circuit of claim 14, wherein the switch is a passgate, the passgate comprising a transistor, the transistor having a gate, the gate being coupled to receive the low power mode signal from the low power mode circuit.

16. The integrated circuit of claim 15, wherein the integrated circuit is a microcontroller.

17. The integrated circuit of claim 16, wherein the analog portion comprises an amplifier, and wherein the capacitor is a compensation capacitor that is part of the amplifier.

18. The integrated circuit of claim 16, wherein the analog portion comprises an analog filter, and wherein the capacitor is a part of the analog filter.

19. A microcontroller integrated circuit comprising:
a digital portion comprising a digital processor, wherein in a low power mode the digital portion is unpowered, and wherein in a nominal power mode the digital portion is powered; and
an analog portion comprising a capacitor, the capacitor having a capacitance of at least one half picofarad, wherein in the low power mode the analog portion is unpowered, and wherein in the nominal power mode the analog portion is powered, wherein the analog portion comprises:
 means for capturing an operating voltage on the capacitor when microcontroller operation transitions from the nominal power mode to the low power mode such that when the analog portion is to be used upon a next transition from the low power mode to the nominal power mode there will be a nonzero voltage on the capacitor.

20. The microcontroller integrated circuit of claim 19, wherein the means comprises a passgate, wherein the microcontroller further comprises:
a sleep mode circuit that generates a sleep mode signal, the sleep mode signal being used: 1) to control the passgate, 2) to control the powering of the digital portion, and 3) to control the powering of the analog portion.

* * * * *